United States Patent [19]

Gordon

[11] 4,436,446

[45] Mar. 13, 1984

[54] ADJUSTABLE, QUICK-RELEASE BARRIER CLAMP

[76] Inventor: James R. Gordon, 301 W. Boling, Benton, Ill. 62812

[21] Appl. No.: 303,833

[22] Filed: Sep. 21, 1981

[51] Int. Cl.³ .......................... B25G 3/36; E04G 7/00
[52] U.S. Cl. .................................... 403/384; 198/861; 24/516; 269/236
[58] Field of Search .............. 403/256, 384, 385, 386, 403/397, 398, 399; 269/236, 91, 93, 94; 24/248 E; 198/861, 836, 525

[56] References Cited

U.S. PATENT DOCUMENTS

| | | | |
|---|---|---|---|
| 1,457,150 | 5/1923 | DeGrave | 403/399 |
| 1,468,478 | 9/1923 | Keffer | 403/399 |
| 2,706,648 | 4/1955 | Gosse | 403/338 |
| 3,170,214 | 2/1965 | Cochrane | 269/94 X |
| 3,989,137 | 11/1976 | Ward | 198/836 |
| 4,204,595 | 5/1980 | Marrs | 198/836 |

FOREIGN PATENT DOCUMENTS

| | | | |
|---|---|---|---|
| 2081367 | 2/1982 | United Kingdom | 198/836 |
| 288641 | 12/1970 | U.S.S.R. | 198/836 |
| 685589 | 9/1979 | U.S.S.R. | 198/836 |

*Primary Examiner*—Wayne L. Shedd
*Attorney, Agent, or Firm*—Kinzer, Plyer, Dorn & McEachran

[57] ABSTRACT

An adjustable, quick-release clamp for fastening a barrier member to a base member includes a clamp support affixed to the base member and protruding therefrom, a main lever carried by the support member, with the support member extending through an aperture in the main lever, and a retainer member that holds the main lever on the support member. A first end of the main lever carries a gripper means adapted to engage the barrier member; an overcenter toggle cam is pivotally mounted on a second end of the main lever, a handle lever being attached to the cam. The cam is movable to raise and lower the first end of the main lever, with the retainer member acting as a fulcrum such that the gripper means engages or releases the barrier member in accordance with the positioning of the toggle cam. The position of the retainer member on the clamp support is adjustable to permit accommodation of variable barrier member thicknesses and to provide for adjustment of the clamping pressure.

10 Claims, 7 Drawing Figures

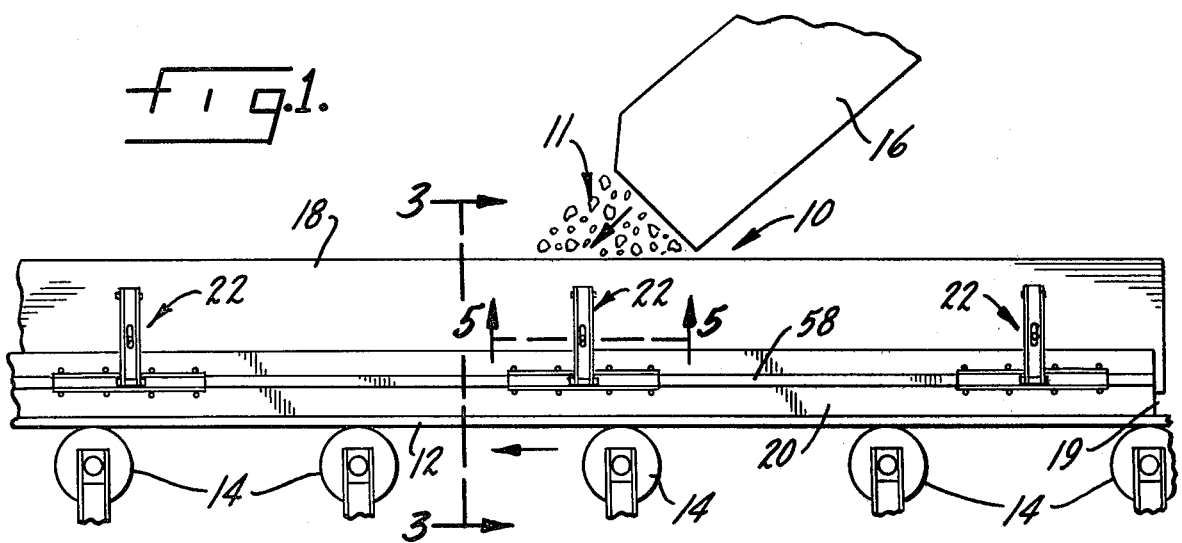
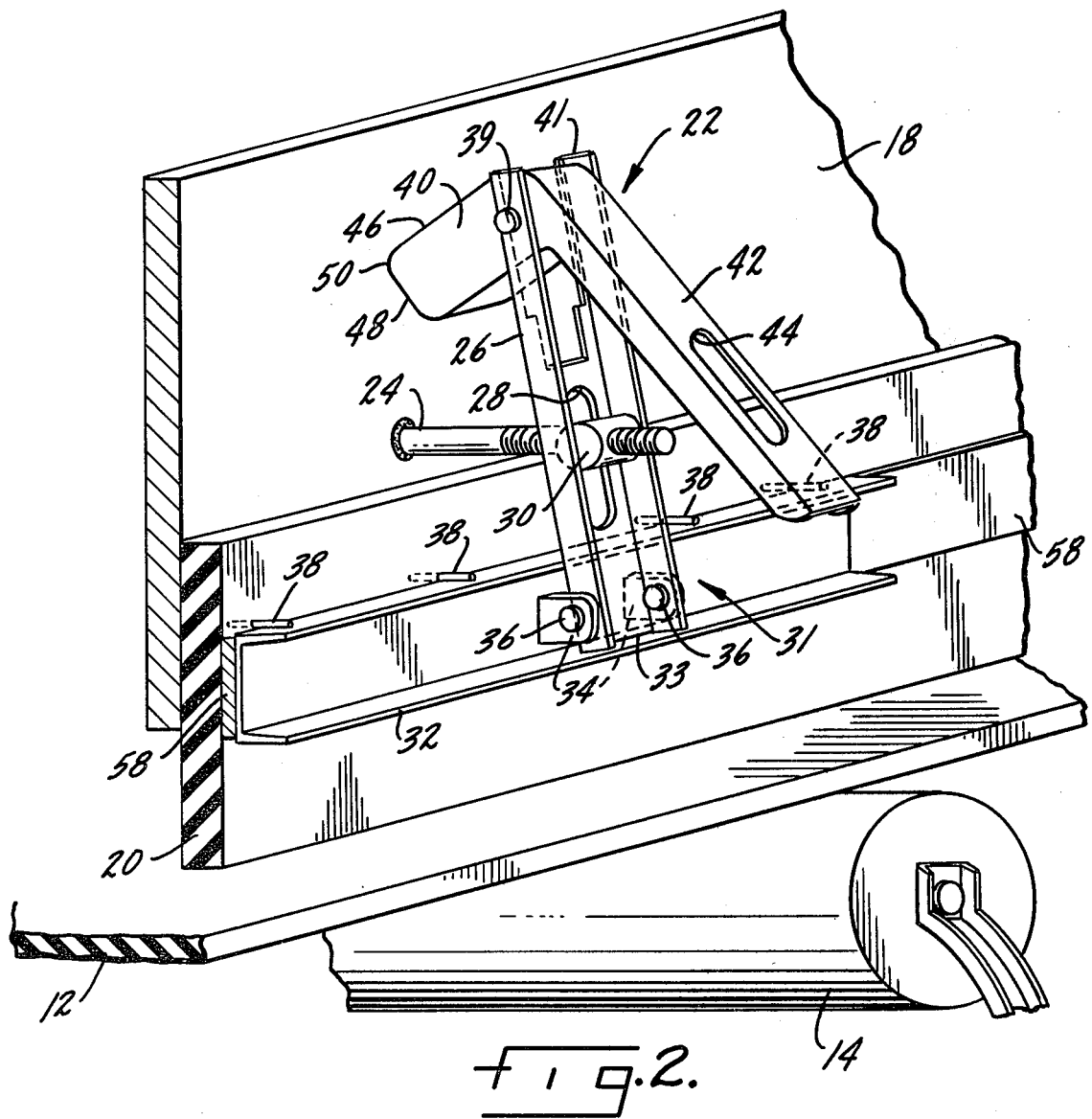

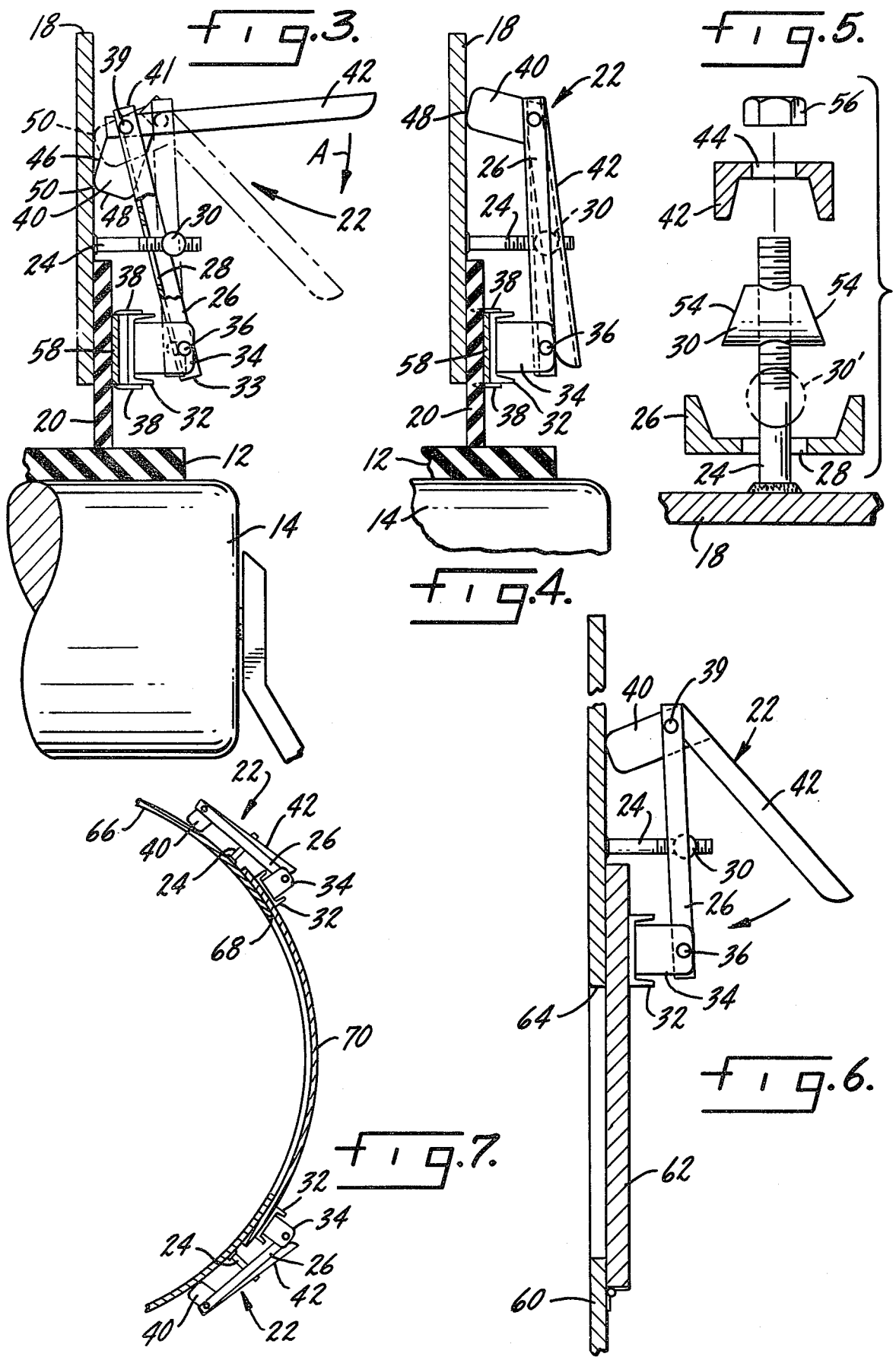

ADJUSTABLE, QUICK-RELEASE BARRIER CLAMP

BACKGROUND OF THE INVENTION

At an input station on an endless belt conveyor used for transporting coal, ore, sand, gravel, or other granular material, spillage of material over the edges of the belt can frequently present a substantial problem. The spillage is usually controlled by positioning skirtboards along the edges of the conveyor belt for some distance downstream of the input location. Because the edges of rigid skirtboards engaging the belt edges would create undue friction and cause excessive wear on the belt, as well as undue loading of the conveyor drive, it has been conventional practice to position each skirtboard a short distance above the edges of the belt and to mount a flexible apron on the skirtboard to close the resulting gap. Some prior art systems have provided for vertical adjustment of the aprons to compensate for wear on the apron edges that contact the moving belt. Skirtboards equipped with vertically adjustable aprons of rubber, canvas, or other resilient material are described in Roberts U.S. Pat. No. 2,593,610 issued Apr. 22, 1952 and in Clegg U.S. Pat. No. 3,499,523 issued Mar. 10, 1970. An improved conveyor skirtboard mounting is described in Gordon U.S. Pat. No. 4,231,471, issued Nov. 4, 1980.

While these previously known skirtboard and apron arrangements can provide effective control of spillage over the sides of the conveyor, some problems remain in fastening the aprons to the skirtboards. For example, previously known systems have not been capable of providing for quick release in a mounting construction that can accommodate substantial variations in apron thickness. The quick-release feature is necessary to minimize down time required by wear-related adjustments of the apron position. Similarly, maximum flexibility dictates that apron clamps be capable of handling a variety of apron thicknesses. Similar problems occur in other barrier mounting applications, including access cover mounts and the like.

SUMMARY OF THE INVENTION

It is a principal object of the present invention, therefore, to provide a new and improved clamp, for fastening a barrier member to a base member, that can be readily engaged or released and is adjustable to accommodate a range of barrier member thicknesses.

Another object of the invention is to provide an improved quick-release clamp that can fasten a barrier member in a range of continuously adjustable, fixed positions.

Another object of the invention is to provide an improved quick-release clamp that permits inversion of the barrier member to fully utilize the material of the barrier member.

A further object of the invention is to provide an improved quick-release clamp which is effectively vibration proof; i.e., vibration will not loosen or release a clamp.

Another object of the present invention is to provide an improved quick-release clamp that can be affixed to a base member by a single support member, and that affords effective adjustment of the clamping pressure.

Another object of the present invention is to provide an improved quick-release clamp that can be used in a clamping system that applies continuous pressure along the length off a barrier member such as a skirtboard apron.

Accordingly, the invention relates to an adjustable, quick-release clamp for clamping a barrier member to a base member. The clamp includes a clamp support member affixed to and projecting outwardly from the base. An elongated main lever has a central aperture through which the clamp support member projects. A retainer member is mounted on the clamp support member outwardly of the main lever in position to retain the main lever on the clamp support member. Gripper means are mounted at a first end of the main lever and are adapted to engage a barrier member. An overcenter toggle cam is pivotally mounted on the second end of the main lever for movement between a release position and a range of clamp positions; the release position affords minimal spacing between the base and the second end of the main lever, whereas in the clamp positions the cam holds the second end of the main lever at a substantial displacement from the base. A handle lever is attached to the cam for manually pivoting the cam between its release and clamp positions. Movement of the cam to its clamp position causes the main lever to engage the retainer and to pivot about the retainer as a fulcrum, this action moves the first end of the main lever toward the base so that the gripper means securely clamps the barrier member to the base. The retainer member is adjustably mounted on the support member for movement toward and away from the base to adjust the fulcrum for the main lever to accommodate barrier members of varying thickness and to permit adjustment of the clamping pressure.

BRIEF DESCRIPTION OF THE DRAWINGS

FIG. 1 is a side elevation view of the input location of a belt conveyor for granular material, illustrating a skirtboard apron assembly fastened by clamps constructed in accordance with one embodiment of the present invention;

FIG. 2 is a perspective view of a portion of a belt conveyor, showing a clamp of the present invention in the release position.

FIG. 3 is sectional elevation view, taken approximately as indicated by line 3—3 in FIG. 1, showing a clamp in release position.

FIG. 4 is a view similar to FIG. 3 but showing the clamp in a closed or clamping position.

FIG. 5 is a detail exploded view, taken approximately as indicated by line 5—5 in FIG. 1.

FIG. 6 is a side elevation view, similar to FIG. 3, illustrating the use of a clamp for fastening a manway cover.

FIG. 7 is a sectional elevation view showing a portion of a pipe or conduit with a cleanout opening cover being held by clamps according to present invention.

DESCRIPTION OF A PREFERRED EMBODIMENT

FIG. 1 illustrates an input station 10 for a conveyor belt 12 supported on a series of rollers 14. Coal, ore, sand, gravel or other granular material 11 is discharged onto conveyor belt 12, at station 10 from a chute 16. In a given system, the discharge chute 16 could comprise the discharge end of another conveyor. An elongated skirtboard or base member 18 is mounted adjacent the near edge of the conveyor belt in either direction. A similar skirtboard (not shown) may be located on the opposite side of belt 12. Both skirtboards are supported by a frame which is not shown but which may be conventional. The lower edge of the skirtboard 18 is positioned a short distance above the surface of the belt to prevent frictional engagement between the skirtboard and the conveyor belt. Thus, there is a gap 19 between the upper surface of belt 12 and the lower edge of skirtboard 18.

The gap 19 between the skirtboard and the conveyor belt is closed by a barrier member or apron 20. The lower edge of the apron contacts the conveyor belt. Together, the skirtboard 18 and the apron 20 prevent spillage of material over the side edges of the belt. The apron 20 is formed of a resilient material such as rubber. The apron is held in place by a series of clamps indicated generally at 22. The clamps are affixed to the skirtboard 18 in a manner described below.

FIG. 2 illustrates a preferred construction for the clamp 22. A clamp support member 24 is affixed to the skirtboard 18. In the embodiment shown the support member is a bolt welded to the skirtboard 18. It will be understood of course, that the support member 24 could be attached in a different manner. The bolt 24 projects outwardly from the skirtboard and is threaded at its outer end. An elongated main lever 26 has a central aperture 28 through which the clamp support member 24 projects.

A retainer member 30 is mounted on the clamp support member 24 outwardly of the main lever 26. Retainer 30 is threaded onto the support member 24 and is capable of engaging the main lever 26 to retain it on the clamp support member. As explained more fuly below, the retainer member preferably has beveled ends. In FIG. 2 the retainer 30 is oriented perpendicular to the elongated aperture or slot 28. In this position the retainer member holds the main lever on the clamp support member. If it is desired to remove the main lever 26 from the support member 24, the retainer member can be rotated 90° from the position illustrated so that the retainer will slip through the slot 28, allowing the entire clamp to be removed from post 24.

Gripper means 31 are mounted on a first end 33 of the main lever 26, adapted to engage the apron 20. The gripper means comprises an elongated gripper bar or channel 32, and includes a pair of brackets 34 which carry pins 36 for pivotally connecting the gripper channel 32 to the first end of the main lever 26. The gripper means 31 further includes two rows of spikes or pins 38 attached to the sides of the gripper channel 32. Only one such row is visible in FIG. 2. The spikes 38 project into the apron 20 to firmly engage the apron and prevent slippage of the apron.

An overcenter toggle cam 40 is pivotally mounted on the second end 41 of the main lever by means of a pivot pin 39. A handle lever 42 in the form of a channel section is attached to the cam 40 for manually pivoting the cam; in the illustrated construction the cam 40 and the handle lever 42 constitute a single, unitary member. The handle lever includes a central aperture or slot 44. The cam 40 has a surface which is normally in contact with the skirtboard 18. This cam surface has three sections including a release portion 46, a lock portion 48 and an intervening lobe 50.

The use, operation and function of the invention can now be explained in conjunction with FIGS. 1-4. An apron 20 is placed in position against a skirtboard 18 with the lower edge of the apron in contact with the conveyor belt 12. The clamp support member 24 has been previously affixed to the skirtboard 18. The main lever 26 is placed on the support member with the support extending through the slot or aperture 28. The retainer member 30 is adjusted to give the desired spacing between the main lever and the skirtboard and then is oriented at right angles to the slot, as in FIG. 2. Initially, the toggle cam 40 is placed in a release position which affords minimal spacing between the skirtboard and the second end 41 of the main lever. Thus, as seen in FIG. 3, the handle lever 42 extends generally perpendicularly to the skirtboard to position the cam in a release position. In this position the release portion 46 of the cam surface is in contact with the skirtboard (FIG. 3).

The clamp is tightened or closed by pushing the handle lever 42 in the direction of arrow A (FIG. 3). This rotation of the handle lever causes the toggle cam 40 to pivot from the release position to a range of clamp positions in which the cam holds the second end 41 of the main lever 26 at a substantial displacement from the skirtboard. This can be seen in FIG. 3 where the handle lever, toggle cam and main lever are shown in phantom. In the position shown in phantom, the cam contacts the skirtboard at the lobe or center position 50 of the cam surface. The main lever has been raised away from the skirtboard. When this happens the main lever 26 pivots about the retainer means 30 as a fulcrum. This moves the first (lower) end 33 of the main lever toward the skirtboard so that the gripper means 31 securely clamps the apron to the skirtboard.

The clamp is locked in the closed position by continuing to rotate the handle lever 42, and hence the toggle cam 40, past the center or lobe portion of the cam surface to the locking portion 48. FIG. 4 shows the clamp in fully closed position with the lock surface 48 of the cam in contact with the skirtboard. The handle lever 42 is closed onto the retainer member 30 and the gripper means is firmly holding the apron 20 against the skirtboard 18. To release the clamp one need only rotate the handle lever 42 upwardly. This will rotate the cam 40 back to the release position, moving the second (upper) end 41 of the main lever toward the skirtboard and thereby shifting the first end 33 of the lever away from the skirtboard. This releases the clamping pressure from the apron.

One of the advantages of the present invention is the adjustability of the retainer member 30 on the support member 24. The threaded retainer member 30 can be moved toward and away from the base to adjust its position as the fulcrum for the main lever. This permits adjustment of the location of the gripper means 31 when it is in the clamp position. Accordingly, a substantial range of variations in the thickness of the apron 20 can be accommodated. In addition, the adjustability of the retainer member 30 affords adjustment of the clamping pressure exerted on the apron.

Another advantage of the clamp of the present invention is that it is essentially vibration proof. That is, vibration associated with the movement of the conveyor has a tendency to change the adjustment of the retainer member 30. The present invention prevents this by positively engaging the retainer member to prevent unwanted movement when the clamp is in a closed or clamp position. This is best seen in FIG. 5. As mentioned above, the retainer member 30 has beveled ends 54. The handle lever 42 is a channel section. When the clamp is fully closed the legs of the handle lever channel section bear on the beveled ends 54 of the retainer member 30. Thus, the retainer member 30 is trapped by the flanges on the handle lever and can not be rotated by vibration. Further protection against vibration may be provided by a lock nut 56 threaded onto the outer end portion of the support member 24. The support extends through the aperture 44 in the handle lever and the lock nut is placed outwardly of the handle member to prevent unwanted release of the clamp. When turned 90° to the position 30', the retainer will pass through the main lever slot 28 (FIG. 5).

The clamp of the present invention is suitable for use in a clamping system wherein clamping pressure is applied continuously along the entire length of the apron. Such a system is shown in FIG. 1 and includes a plurality of individual clamps 22 of the type described above. The clamps are attached to the skirtboard at spaced intervals. A stiffener strap 58 is disposed between the gripper means of the clamp and the apron. The strap is located between the rows of spikes or pins 38. The spikes act as guides to hold the stiffener strap in place prior to closing the clamps. The stiffener strap distributes the clamping pressure along the length of the apron. Thus, any tendency of the apron 20 to bulge out away from the skirtboard at points between the clamps 22 is overcome by the stiffener strap.

The clamp of the present invention can be utilized in applications other than the conveyor belt apron situation described above. For example, in certain large vessels, ducts, or conduits it is necessary to provide access to the interior through a manway. One wall of such a vessel is shown in FIG. 6 at 60. A hinged barrier member 62 covers a manway opening 64. One or more clamps 22 hold the barrier member in place. The spikes are deleted from the gripper means in this application. FIG. 7 shows another alternate use for the clamp of the present invention. Here a large pipe 66 has a pipe cleanout opening 68 which is normally closed off by a cover 70. A series of clamps 22 hold the cover 70 in place.

I claim:

1. An adjustable quick-release clamp which clamps a barrier member to a base, comprising:

a clamp support member affixed to and projecting outwardly from the base;

an elongated main lever having a central aperture through which the clamp support member projects;

a retainer member, mounted on the clamp support member outwardly of the main lever in position to retain the main lever on the clamp support member and acting as a fulcrum for the main lever, the retainer member being adjustably mounted on the support member for movement toward and away from the base adjusting the fulcrum for the main lever to accommodate barrier members of varying thickness, and permitting adjustment of the clamping pressure;

gripper means mounted on a first end of the main lever, on the side of the main lever facing the base, adapted to engage a barrier member;

an overcenter toggle cam, pivotally mounted on the second end of the main lever for movement between a release position, affording minimal spacing between the base and the second end of the main lever, and a range of clamp positions in which the cam holds the second end of the main lever at a substantial displacement from the base, movement of the cam to a clamp position causing the main lever to engage the retainer member and pivot about the retainer member as a fulcrum, moving the first end of the main lever toward the base so that the gripper means securely clamps the barrier member to the base;

and a handle lever, attached to the cam, for manually pivoting the cam between its release and clamp positions.

2. The clamp of claim 1 wherein the handle lever, when in a fully closed clamp position, traps the retainer member between the handle lever and the main lever to lock the retainer member in place and prevent unwanted movement of the retainer member on the support member.

3. The clamp of claim 2 wherein the handle lever is a channel-shaped section and the retainer member has beveled ends, the flanges of the handle lever channel section engaging the beveled surfaces of the retainer member to lock it in place.

4. The clamp of claim 1 wherein the support member is a bolt which is welded to the base.

5. The clamp of claim 1 wherein the gripper means is pivotally mounted on the first end of the main lever.

6. The clamp of claim 1 further comprising a central aperture in the handle lever through which the clamp support member projects when the handle lever is in a fully closed clamp position, and a locking member mounted on the clamp support member outwardly of the handle lever in position to lock the handle lever in the fully closed position.

7. The clamp of claim 1 wherein the gripper means includes an elongated gripper bar.

8. The clamp of claim 1 further comprising a plurality of spikes on the gripper means, adapted to engage a barrier member.

9. An adjustable clamping system which clamps an elongated barrier member to an elongated base by applying clamping pressure along the entire length of the barrier member, comprising:

(a) a plurality of individual clamps attached to the base and spaced at intervals therealong, each clamp including gripper means which are movable between a release position and a clamp position in which the gripper means securely clamps the barrier member to the base, and means for moving the gripper means between the release and clamp positions, the means for moving the gripper means including:

(i) a clamp support member affixed to and projecting outwardly from the base;

(ii) an elongated main lever having a central aperture through which the clamp support member projects, the gripper means being mounted on a first end of the main lever;

(iii) a retainer member mounted on the clamp support member outwardly of the main lever in position to retain the main lever on the clamp support member;

(iv) an overcenter toggle cam, pivotally mounted on the second end of the main lever for movement between the release position, affording minimal spacing between the base and the second end of the main lever, and a range of clamp positions in which the cam holds the second end of the main lever at a substantial displacement from the base;

(v) and a handle lever, attached to the cam, for manually pivoting the cam between its release and clamp positions;

(vi) movement of the cam to its clamp position causing the main lever to engage the retainer and to pivot about the retainer as a fulcrum, moving the first end of the main lever toward the base so that the gripper means securely clamps the barrier member to the base;

(b) two rows of spikes attached to the gripper means and protruding therefrom to define a slot between the rows, the slot extending generally in a direction parallel to the extent of the elongated barrier member; and (c) a stiffener strap disposed between the gripper means and the barrier member and in the slot defined by the spike rows, the strap extending between adjacent clamps to apply clamping pressure to the portions of the elongated barrier member not engaged by the gripper means.

10. The clamp of claim 9 wherein the retainer member is adjustably mounted on the support member for movement toward and away from the base to adjust the fulcrum for the main lever to accommodate barrier members of varying thickness, and to permit adjustment of the clamping pressure.

* * * * *